United States Patent
Rahmati et al.

(10) Patent No.: US 12,079,962 B2
(45) Date of Patent: Sep. 3, 2024

(54) METHOD AND APPARATUS FOR ADAPTIVE MULTI-FRAME IMAGE FUSION

(71) Applicant: Samsung Electronics Co., Ltd., Gyeonggi-do (KR)

(72) Inventors: Mojtaba Rahmati, San Diego, CA (US); Dongwoon Bai, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 278 days.

(21) Appl. No.: 17/215,529

(22) Filed: Mar. 29, 2021

(65) Prior Publication Data
US 2022/0188984 A1 Jun. 16, 2022

Related U.S. Application Data

(60) Provisional application No. 63/124,247, filed on Dec. 11, 2020.

(51) Int. Cl.
*G06K 9/00* (2022.01)
*G06T 5/50* (2006.01)
*G06T 5/70* (2024.01)

(52) U.S. Cl.
CPC .............. *G06T 5/70* (2024.01); *G06T 5/50* (2013.01); *G06T 2207/20024* (2013.01); *G06T 2207/20221* (2013.01); *G06T 2207/20224* (2013.01)

(58) Field of Classification Search
CPC . G06T 5/50; G06T 2207/20221; G06T 5/002; G06T 2207/20224; G06T 2207/20182; G06T 2207/10004
See application file for complete search history.

(56) References Cited

U.S. PATENT DOCUMENTS

| | | | |
|---|---|---|---|
| 9,105,088 B1 * | 8/2015 | Petrie | G06T 5/004 |
| 9,558,543 B2 | 1/2017 | Hsieh et al. | |
| 9,852,353 B2 | 12/2017 | Lin et al. | |
| 10,341,658 B2 | 7/2019 | Peng et al. | |
| 10,805,649 B2 * | 10/2020 | Pekkucuksen | G06V 40/162 |
| 11,107,205 B2 * | 8/2021 | Hu | G06T 5/003 |
| 2015/0245071 A1 | 8/2015 | Yang et al. | |
| 2019/0362477 A1 * | 4/2019 | Rahmati | G06T 5/20 |
| 2020/0265567 A1 | 8/2020 | Hu et al. | |
| 2020/0364834 A1 | 11/2020 | Ferres et al. | |

FOREIGN PATENT DOCUMENTS

WO WO-2017205492 A1 * 11/2017 .......... G06T 3/0093

OTHER PUBLICATIONS

Hasinoff, Samuel W. et al., "Burst photography for high dynamic range and low-light imaging on mobile cameras", ACM Trans. Graph., vol. 35, . . . No. 6, Article 192, Publication Date: Nov. 2016, pp. 12.

* cited by examiner

*Primary Examiner* — Andrew M Moyer
*Assistant Examiner* — Owais Iqbal Memon
(74) *Attorney, Agent, or Firm* — The Farrell Law Firm, P.C.

(57) ABSTRACT

A method and system are provided. The method includes obtaining a difference map between a reference frame and a non-reference frame, estimating a noise variance of the obtained difference map, obtaining merging weights based on the estimated noise variance and the obtained different map, and merging the non-reference frame with the reference frame using the obtained merging weights.

16 Claims, 3 Drawing Sheets

METHOD AND APPARATUS FOR ADAPTIVE MULTI-FRAME IMAGE FUSION

PRIORITY

This application is based on and claims priority under 35 U.S.C. § 119(e) to U.S. Provisional Patent Application Ser. No. 63/124,247, filed on Dec. 11, 2020, the entire contents of which are incorporated herein by reference.

FIELD

The present disclosure is generally related to image denoising.

BACKGROUND

In multi-frame image fusion, it is desirable to reduce the noise and for the fusion to be robust against alignment errors due to imperfect compensation of a camera and/or motion in a scene.

SUMMARY

In accordance with an aspect of the present disclosure, a method is provided. The method includes obtaining a difference map between a reference frame and a non-reference frame, estimating a noise variance of the obtained difference map, obtaining merging weights based on the estimated noise variance and the obtained different map, and merging the non-reference frame with the reference frame using the obtained merging weights.

In accordance with an aspect of the present disclosure, a system is provided. The system includes a memory and a processor configured to obtain a difference map between a reference frame and a non-reference frame, estimate a noise variance of the obtained difference map, obtain merging weights based on the estimated noise variance and the obtained different map, and merge the non-reference frame with the reference frame using the obtained merging weights.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
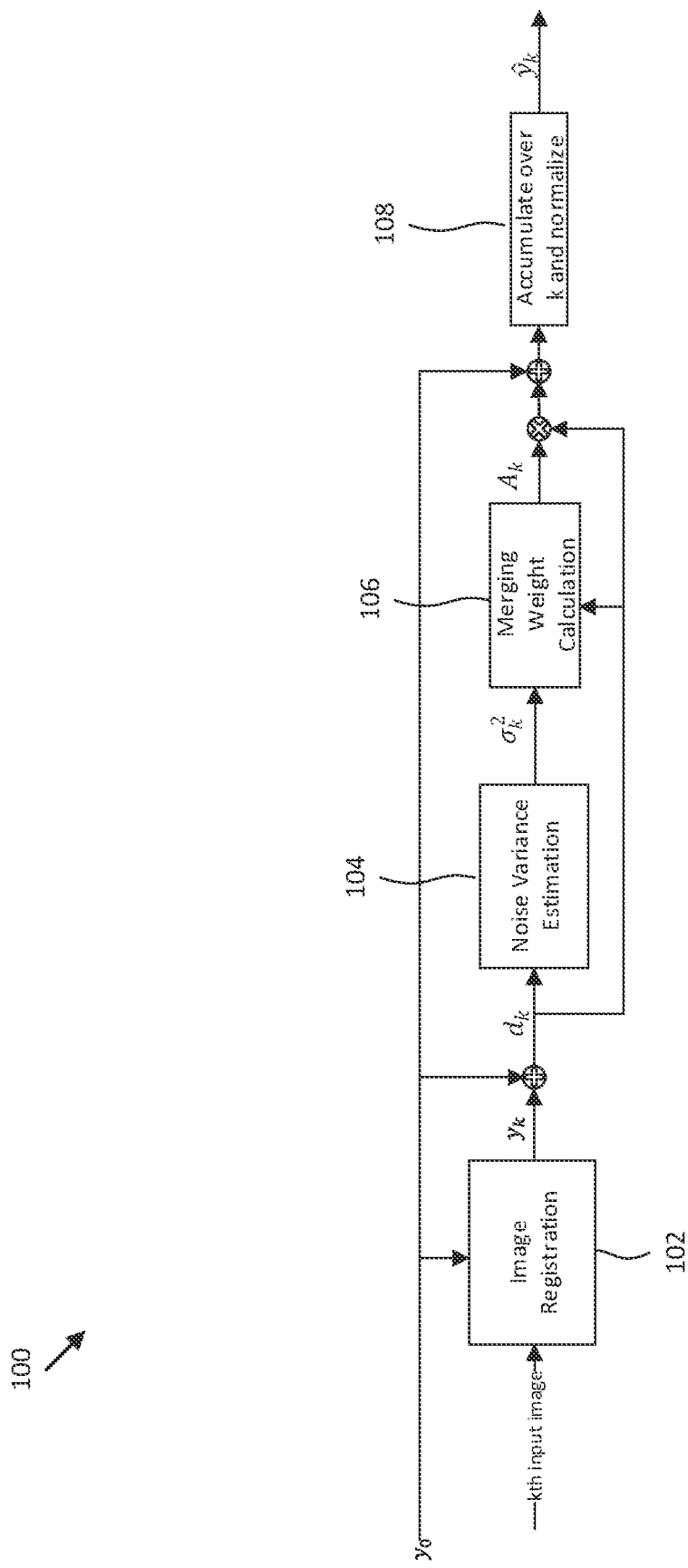
FIG. 1 illustrates a diagram of a system for multi-frame image fusion, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

For adaptive temporal denoising, a multi-frame based noise variance estimation is disclosed where a noise power map is estimated (per pixel) to control the temporal fusion power. The power of the difference between the reference frame and each non-reference frame is compared with the corresponding estimated noise power to determine whether the difference is due to the noise (i.e., to apply full averaging) or due to the local motion (i.e., to reject the merging).

For the system model, a burst of N noisy images is considered with $y_k(x,y)$ denoting the luminance of the k-th warped image frame (post image registration to align with the reference frame), and $c_k(x,y)$ denoting the chrominance of the k-th image frame (either U or V channels), $k \in \{0, \ldots, N-1\}$ and (x,y) denoting the two-dimensional (2D) spatial pixel position.

One goal in multi-frame fusion is to apply temporal averaging in non-motion areas (i.e., the reference frame and the non-reference frame are well-aligned) and avoid averaging in local motion areas (i.e., the reference frame and the non-reference frame are not aligned). One example of a merging strategy is to obtain the difference map between the reference frame and the non-reference frame to determine the level of fusion which is determined by comparing with a pre-set threshold (i.e., that representative of the noise power). For adaptive temporal denoising, a multi-frame based noise variance estimation is disclosed where a noise power map is estimated (e.g., per pixel) to control the level of the temporal fusion. The power of the difference between the reference frame and each non-reference frame is compared with the corresponding estimated noise power to determine whether the difference is due to the noise (i.e., to apply full averaging) or due to the local motion (i.e., to reject the merging).

First, the system obtains a difference map between a reference frame and a non-reference frame. The difference map may be a map ($D_k(i, j)$ with $i \in \{1, \ldots, W\}$, $j \in \{1, \ldots, H\}$) between the reference frame and the kth non-reference frame. The map may be obtained as in Equation (1):

$$d_k(i,j) = y_0(i,j) - y_k(i,j), i \in \{1, \ldots, W\}, j \in \{1, \ldots, H\}$$

$$d_{G,k} = \text{Blur}(d_k)$$

$$D_k = \text{Blur}(d_{G,k}^2) \quad (1)$$

A blur operation may be applied to reduce the impact of noise in the difference map. Any blur operation may be used, such as 5×5 Gaussian filtering or 5×5 box filtering.

Next, the system estimates the noise variance of the difference map. The noise variance may be estimated as in Equation (2):

$$V_k(i,j) = \min(D_k(i,j), \text{SigmaMax } D) - \text{Blur}(d_{G,k}(i,j))^2 \quad (2)$$

Equation (2) calculates the local variance over the difference between the two frames. For perfectly aligned regions, the variance indicates the noise power. For local motion regions, the variance of the difference map indicates large values around the borders of the moving objects, which may be limited through a tuning parameter SigmaMaxD, which acts as a predetermined ceiling threshold. For Blur ($d_{Blur,k}(i,j))^2$ > SigmaMaxD, $V_k(i,j) = 0$, which is equivalent with declaring motion.

The estimated noise variance may be further controlled with tuning parameters SigmaMin, SigmaMax and SigmaScale, which act as a predetermined floor threshold, predetermined ceiling threshold, and predetermined scaling threshold, respectively, as in Equation (3).

$$\sigma_k^2(i,j) = \min(\max(\text{SigmaScale} \times V_k(i,j), \text{SigmaMin}), \text{SigmaMax}) \quad (3)$$

The system then obtains the merging weight. The merging weight may be obtained as in Equation (4):

$$A_k(i, j) = \frac{\max(D_k(i, j) - \sigma_k^2(i, j), 0)}{D_k(i, j)} \quad (4)$$

where $\sigma_k^2(i, j)$ represents the noise power map which is estimated. The merging weight may be obtained using a floor. In Equation (4), the floor is set to 0, although other values for the floor may be utilized. The merging weight may be normalized with respect to the different map. In Equation (4), this is performed by dividing by $D_k(i,j)$. The merging weight in Equation (4) is based on a difference between the difference map and the noise power map. The merging is carried out in the form of, as in Equation (5).

$$\hat{y}_0(i, j) = \frac{1}{N}\left(y_0(i, j) - \sum_{k=1}^{N-1}(y_k(i, j) + A_k(i, j)[y_0(i, j) - y_k(i, j)])\right) \quad (5)$$

FIG. 1 illustrates a diagram of a system 100 for multi-frame image fusion, according to an embodiment. The system receives a kth input image and performs image registration 102. The system determines the image luminance or chrominance $y_k$ and obtains a difference map $d_k$ based on the luminance or chrominance. While the present disclosure discusses luminance and chroma by way of example of image, video, or pixel parameters, other such parameters (e.g., parameters of a red-green-blue (RGB), red-green-blue-green (RGBG), or other encoding scheme) may be used as appropriate (e.g., may be used for determining a difference map). The system performs noise variance estimation at 104 to produce the noise variance estimate $\sigma_k^2$. The system performs a merging weight calculation at 106 to obtain the merging weight $A_k(i,j)$. The system accumulates over the k images and normalizes at 108 to obtain the final merged result.

Figure 2:
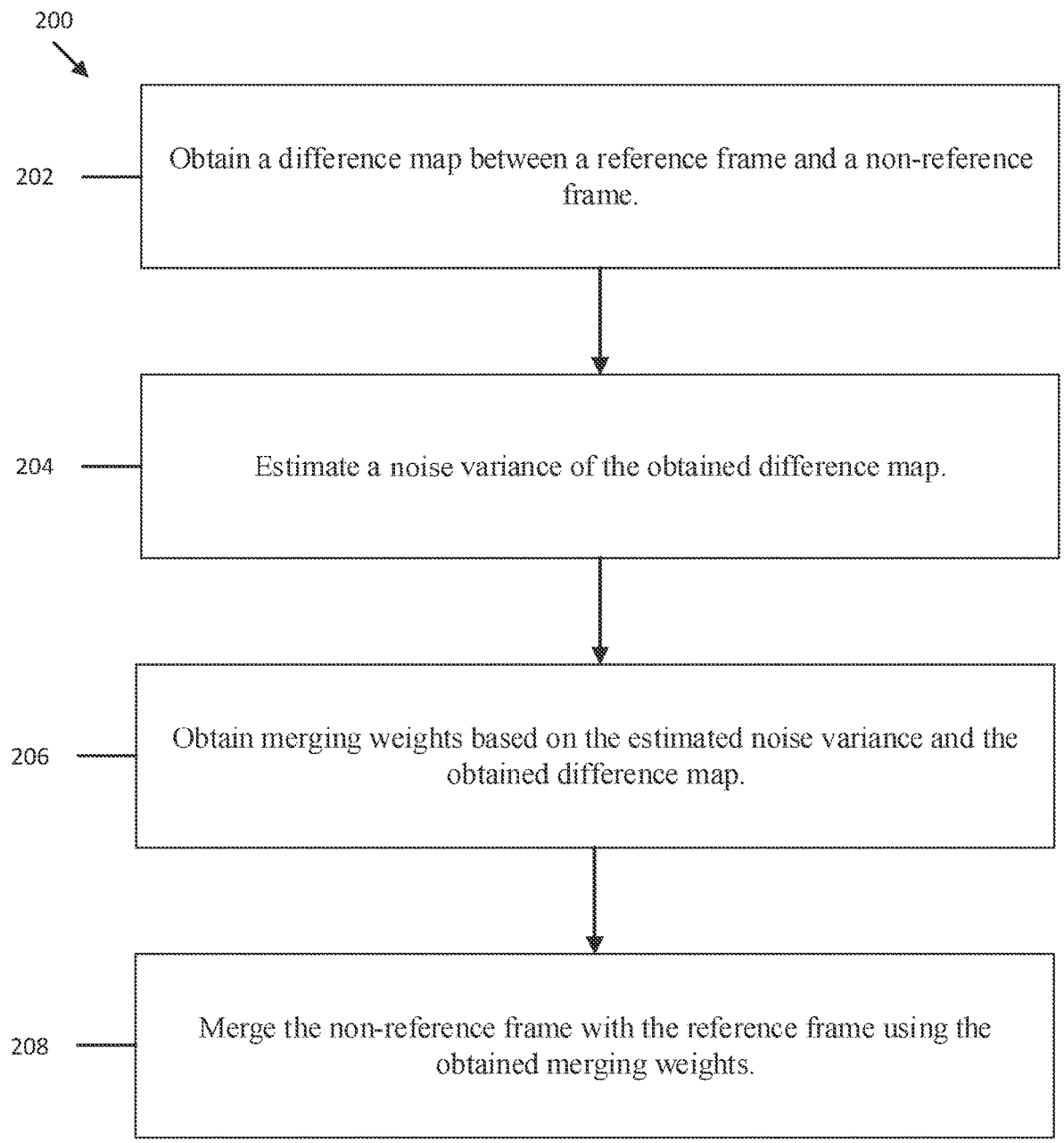
FIG. 2 illustrates a flowchart for a method of multi-frame image fusion, according to an embodiment.

FIG. 2 illustrates a flowchart 200 for a method of multi-frame image fusion, according to an embodiment. At 202, the system obtains a difference map between a reference frame and a non-reference frame. At 204, the system estimates a noise variance of the obtained difference map. At

206, the system obtains the merging weights based on the estimated noise variance and the obtained difference map. At 208, the system merges the non-reference frame with the reference frame using the obtained merging weight at 206. The merging may be performed independently per non-reference frame and the final merging result may be obtained after accumulating and normalizing the merging contribution from each non-reference frame.

Figure 3:
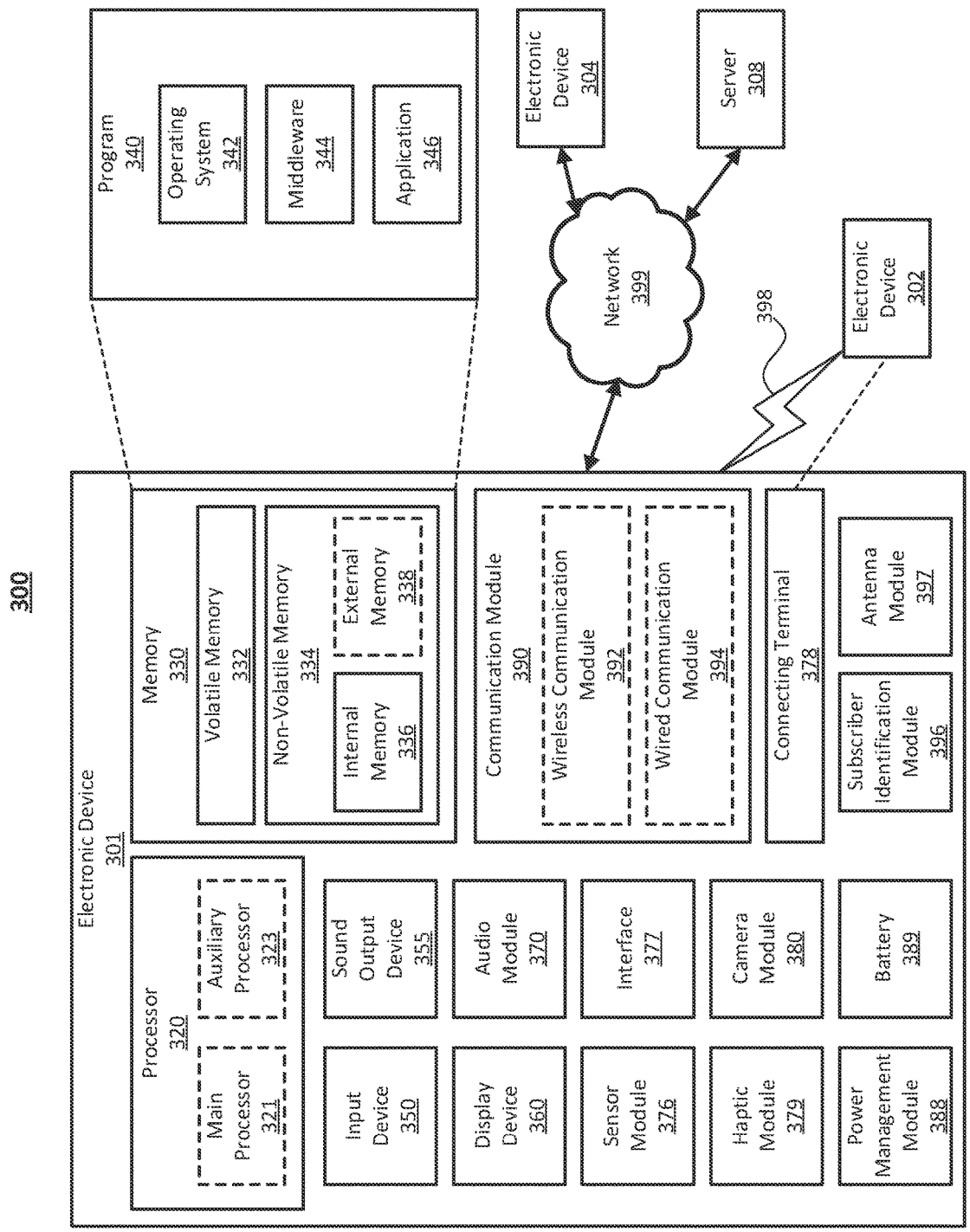
FIG. 3 illustrates a block diagram of an electronic device in a network environment, according to one embodiment.

FIG. 3 illustrates a block diagram of an electronic device 301 in a network environment 300, according to one embodiment. Referring to FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). The electronic device 301 may communicate with the electronic device 304 via the server 308. The electronic device 301 may include a processor 320, a memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In one embodiment, at least one (e.g., the display device 360 or the camera module 380) of the components may be omitted from the electronic device 301, or one or more other components may be added to the electronic device 301. In one embodiment, some of the components may be implemented as a single integrated circuit (IC). For example, the sensor module 376 (e.g., a fingerprint sensor, an iris sensor, or an illuminance sensor) may be embedded in the display device 360 (e.g., a display).

The processor 320 may execute, for example, software (e.g., a program 340) to control at least one other component (e.g., a hardware or a software component) of the electronic device 301 coupled with the processor 320, and may perform various data processing or computations. As at least part of the data processing or computations, the processor 320 may load a command or data received from another component (e.g., the sensor module 376 or the communication module 390) in volatile memory 332, process the command or the data stored in the volatile memory 332, and store resulting data in non-volatile memory 334. The processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or execute a particular function. The auxiliary processor 323 may be implemented as being separate from, or a part of, the main processor 321.

The auxiliary processor 323 may control at least some of the functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to one embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by other component (e.g., the processor 320) of the electronic device 301, from the outside (e.g., a user) of the electronic device 301. The input device 350 may include, for example, a microphone, a mouse, or a keyboard.

The sound output device 355 may output sound signals to the outside of the electronic device 301. The sound output device 355 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to one embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to one embodiment, the audio module 370 may obtain the sound via the input device 350, or output the sound via the sound output device 355 or a headphone of an external electronic device 302 directly (e.g., wired) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. The sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device 302 directly (e.g., wired) or wirelessly. According to one embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device 302. According to one embodiment, the connecting terminal 378 may include, for example, an HDMI connector, a USB connector, an SD card connector, or an audio connector (e.g., a headphone connector).

The haptic module 379 may convert an electrical signal into a mechanical stimulus (e.g., a vibration or a movement) or an electrical stimulus which may be recognized by a user via tactile sensation or kinesthetic sensation. According to one embodiment, the haptic module 379 may include, for example, a motor, a piezoelectric element, or an electrical stimulator.

The camera module 380 may capture a still image or moving images. According to one embodiment, the camera module 380 may include one or more lenses, image sensors, image signal processors, or flashes.

The power management module 388 may manage power supplied to the electronic device 301. The power management module 388 may be implemented as at least part of, for example, a power management integrated circuit (PMIC).

The battery 389 may supply power to at least one component of the electronic device 301. According to one embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the AP) and supports a direct (e.g., wired) communication or a wireless communication. According to one embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or a standard of the Infrared Data Association (IrDA)) or the second network 399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to one embodiment, the antenna module 397 may include one or more antennas, and, therefrom, at least one antenna appropriate for a communication scheme used in the communication network, such as the first network 398 or the second network 399, may be selected, for example, by the communication module 390 (e.g., the wireless communication module 392). The signal or the power may then be transmitted or received between the communication module 390 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. All or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

One embodiment may be implemented as software (e.g., the program 340) including one or more instructions that are stored in a storage medium (e.g., internal memory 336 or external memory 338) that is readable by a machine (e.g., the electronic device 301). For example, a processor of the electronic device 301 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising obtaining a difference map between a reference frame and a non-reference frame; estimating a noise power map of the difference map; obtaining merging weights by normalizing a difference between the noise power map and the difference map, wherein the difference is normalized by dividing by the difference map; and merging the non-reference frame with the reference frame using the merging weights.

2. The method of claim 1, wherein obtaining the difference map comprises applying a blur operation.

3. The method of claim 2, wherein the blur operation includes Gaussian filtering.

4. The method of claim 2, wherein the blur operation includes box filtering.

5. The method of claim 1, wherein the noise power map is estimated based on at least one tuning parameter.

6. The method of claim 1, wherein the noise power map is estimated based on a blur term.

7. The method of claim 1, wherein the difference map is based on luminance.

8. The method of claim 1, wherein the difference map is based on chrominance.

9. A system, comprising: a memory, and a processor configured to: obtain a difference map between a reference frame and a non-reference frame; estimate a noise power map of the difference map; obtain merging weights by normalizing a difference between the noise power map and the difference map, wherein the difference is normalized by dividing by the difference map; and merge the non-reference frame with the reference frame using the merging weights.

10. The system of claim 9, wherein the processor is further configured to obtain the difference map by applying a blur operation.

11. The system of claim 10, wherein the blur operation includes Gaussian filtering.

12. The system of claim 10, wherein the blur operation includes box filtering.

13. The system of claim 9, wherein the noise power map is estimated based on at least one tuning parameter.

14. The system of claim 9, wherein the noise power map is estimated based on a blur term.

15. The system of claim 9, wherein the difference map is based on luminance.

16. The system of claim 9, wherein the difference map is based on chrominance.

* * * * *